United States Patent
Chae

(10) Patent No.: US 11,540,690 B2
(45) Date of Patent: Jan. 3, 2023

(54) ARTIFICIAL INTELLIGENCE ROBOT CLEANER

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 448 days.

(21) Appl. No.: 16/655,024

(22) Filed: Oct. 16, 2019

(65) Prior Publication Data

US 2020/0046193 A1 Feb. 13, 2020

(30) Foreign Application Priority Data

Aug. 23, 2019 (KR) .......................... 10-2019-0104046

(51) Int. Cl.
*A47L 11/40* (2006.01)
*A47L 9/28* (2006.01)
(Continued)

(52) U.S. Cl.
CPC .......... *A47L 11/4011* (2013.01); *A47L 9/009* (2013.01); *A47L 9/2826* (2013.01); *A47L 9/2852* (2013.01);
(Continued)

(58) Field of Classification Search
CPC .... A47L 11/4011; A47L 9/009; A47L 9/2826; A47L 9/2852; A47L 11/4061;
(Continued)

(56) References Cited

U.S. PATENT DOCUMENTS

| 5,995,884 A * | 11/1999 | Allen | G05D 1/0234 |
| | | | 701/25 |
| 8,510,255 B2 * | 8/2013 | Fadell | H04L 12/2823 |
| | | | 706/52 |

(Continued)

FOREIGN PATENT DOCUMENTS

| JP | 6091771 | 3/2017 |
| JP | 2018075167 | 5/2018 |
| KR | 20190087355 | 7/2019 |

OTHER PUBLICATIONS

Korean Intellectual Property Office Application Serial No. 10-2019-0104046, Office Action dated Dec. 22, 2020, 4 pages.

(Continued)

*Primary Examiner* — Bhavesh V Amin
(74) *Attorney, Agent, or Firm* — Lee, Hong, Degerman, Kang & Waimey PC

(57) ABSTRACT

Provided is a robot cleaner. The artificial intelligence robot cleaner includes a traveling driving unit configured to allow the artificial intelligence robot cleaner to travel in an indoor space of a home, a cleaning unit configured to remove pollutants, a sensor configured to acquire data that is used to identify a plurality of members, and a processor configured to control the traveling driving unit and the cleaning unit so as to determine one or more subordinate spaces corresponding to each of the plurality of members among a plurality of subordinate spaces by using the data and a map of the indoor space, determine a return time of some or all of the plurality of members, determine a cleaning priority of the plurality of subordinate spaces based on the return time, and perform cleaning according to the cleaning priority.

14 Claims, 13 Drawing Sheets

(51) Int. Cl.
  *A47L 9/00* (2006.01)
  *G05D 1/00* (2006.01)
  *G05D 1/02* (2020.01)
(52) U.S. Cl.
  CPC ........ *A47L 11/4061* (2013.01); *A47L 11/4066* (2013.01); *G05D 1/0088* (2013.01); *G05D 1/0225* (2013.01); *A47L 2201/04* (2013.01); *G05D 2201/0203* (2013.01)
(58) Field of Classification Search
  CPC ............. A47L 11/4066; A47L 2201/04; A47L 9/2805; A47L 9/2894; A47L 9/2857; A47L 2201/06; G05D 1/0088; G05D 1/0225; G05D 2201/0203; G05D 1/0274; B25J 9/161; B25J 9/1679; B25J 11/0085; B25J 13/003
  See application file for complete search history.

(56) References Cited

U.S. PATENT DOCUMENTS

| | | | |
|---|---|---|---|
| 9,233,472 B2* | 1/2016 | Angle | G06Q 10/1095 |
| 9,375,847 B2* | 6/2016 | Angle | H04L 12/282 |
| 9,380,922 B2* | 7/2016 | Duffley | G05D 1/0274 |
| 9,402,518 B2* | 8/2016 | Burlutskiy | A47L 9/2826 |
| 9,626,685 B2* | 4/2017 | Martinez | G06F 16/951 |
| 9,782,050 B2* | 10/2017 | Kim | G06V 10/22 |
| 9,789,605 B2* | 10/2017 | Meier | G05D 1/0088 |
| 9,877,630 B2* | 1/2018 | Wolfe | A47L 11/28 |
| 9,919,420 B1* | 3/2018 | Theobald | B25J 13/003 |
| 9,974,422 B2* | 5/2018 | Lee | G05D 1/0246 |
| 10,130,232 B2* | 11/2018 | Atchley | G01S 1/70 |
| 10,463,217 B1* | 11/2019 | Bialek | A47L 11/28 |
| 10,496,063 B1* | 12/2019 | Ebrahimi Afrouzi | A47L 11/4011 |
| 10,878,294 B2* | 12/2020 | Jones | A47L 9/009 |
| 2005/0096790 A1* | 5/2005 | Tamura | G05D 1/0274 700/245 |
| 2006/0257999 A1* | 11/2006 | Chang | C40B 60/06 435/289.1 |
| 2007/0192910 A1* | 8/2007 | Vu | B25J 19/06 901/17 |
| 2009/0042281 A1* | 2/2009 | Chang | G01N 35/0099 435/287.1 |
| 2010/0076600 A1* | 3/2010 | Cross | H04N 21/4788 700/264 |
| 2012/0066168 A1* | 3/2012 | Fadell | H05B 47/115 702/140 |
| 2013/0184867 A1* | 7/2013 | Jang | B25J 9/1674 700/253 |
| 2013/0206177 A1* | 8/2013 | Burlutskiy | A47L 11/4011 15/319 |
| 2013/0232717 A1* | 9/2013 | Lee | G08B 13/19613 901/1 |
| 2013/0290234 A1* | 10/2013 | Harris | G06N 5/022 901/50 |
| 2014/0207280 A1* | 7/2014 | Duffley | A47L 11/4011 700/257 |
| 2014/0207281 A1* | 7/2014 | Angle | H04L 12/282 700/257 |
| 2014/0207282 A1* | 7/2014 | Angle | H04W 4/30 901/1 |
| 2015/0052703 A1* | 2/2015 | Lee | G05D 1/0255 701/28 |
| 2018/0284786 A1* | 10/2018 | Moshkina-Martinson | A47L 9/2847 |
| 2019/0212752 A1* | 7/2019 | Fong | A47L 9/2857 |
| 2019/0213438 A1* | 7/2019 | Jones | G06V 30/194 |
| 2019/0248007 A1* | 8/2019 | Duffy | B25J 15/0066 |
| 2020/0013221 A1* | 1/2020 | Woo | G06F 16/5866 |
| 2020/0016764 A1* | 1/2020 | Chae | G06N 20/00 |
| 2020/0027277 A1* | 1/2020 | Woo | G06Q 30/0643 |
| 2020/0046193 A1* | 2/2020 | Chae | A47L 9/2826 |
| 2020/0054185 A1* | 2/2020 | Kim | G05D 1/0285 |
| 2020/0178748 A1* | 6/2020 | Han | A47L 11/4038 |
| 2020/0272168 A1* | 8/2020 | Send | G05D 1/0274 |
| 2021/0224579 A1* | 7/2021 | Jones | A47L 9/009 |
| 2021/0321848 A1* | 10/2021 | Chae | B25J 9/1666 |

OTHER PUBLICATIONS

Korean Intellectual Property Office Application No. 10-2019-0104046, Notice of Allowance dated Jul. 27, 2021, 2 pages.

* cited by examiner (a)

(b)

(a)

(b)

(a)

(b)

ARTIFICIAL INTELLIGENCE ROBOT CLEANER

CROSS-REFERENCE TO RELATED APPLICATIONS

Pursuant to 35 U.S.C. § 119(a), this application claims the benefit of earlier filing date and right of priority to Korean Patent Application No. 10-2019-0104046, filed on Aug. 23, 2019, the contents of which are hereby incorporated by reference herein in its entirety.

BACKGROUND

The present disclosure relates to an artificial intelligence robot cleaner that is capable of changing an order of cleaning according to a return time of a member.

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Meanwhile, techniques for recognizing and learning surrounding situations by using artificial intelligence, providing information desired by the user in a desired form, or performing a desired operation or function are being actively studied.

Also, electronic devices that provide various operations and functions may be called artificial intelligence devices.

The current robot cleaner only sets a moving path and travels along the set moving path, but does not consider whether a member exists in the indoor space.

Also, the member existing in the indoor space may feel uncomfortable due to movement or noise of the robot cleaner when the robot cleaner performs cleaning around the member. Also, from the perspective of the robot cleaner, if a person exists around the robot cleaner while the robot cleaner performs cleaning, movement of the person may be sensed to cause an error.

SUMMARY

Embodiments provide an artificial intelligence robot cleaner that is capable of changing an order of cleaning according to a return time of a member.

In one embodiment, an artificial intelligence robot cleaner includes: a traveling driving unit configured to allow the artificial intelligence robot cleaner to travel in an indoor space of a home; a cleaning unit configured to remove pollutants; a sensor configured to acquire data that is used to identify a plurality of members; and a processor configured to control the traveling driving unit and the cleaning unit so as to determine one or more subordinate spaces corresponding to each of the plurality of members among a plurality of subordinate spaces by using the data and a map of the indoor space, determine a return time of some or all of the plurality of members, determine a cleaning priority of the plurality of subordinate spaces based on the return time, and perform cleaning according to the cleaning priority.

The details of one or more embodiments are set forth in the accompanying drawings and the description below.

Other features will be apparent from the description and drawings, and from the claims.

DETAILED DESCRIPTION OF THE EMBODIMENTS

Figure 1:
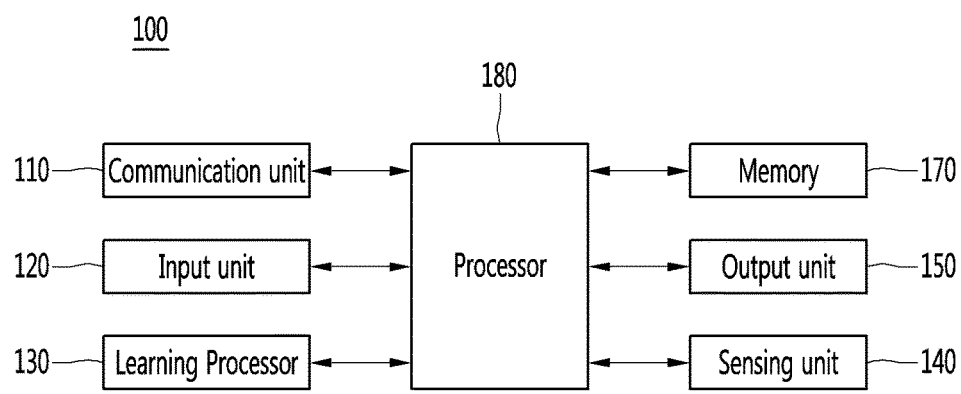
FIG. 1 is a view an artificial intelligence (AI) device 100 according to an embodiment.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<Extended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
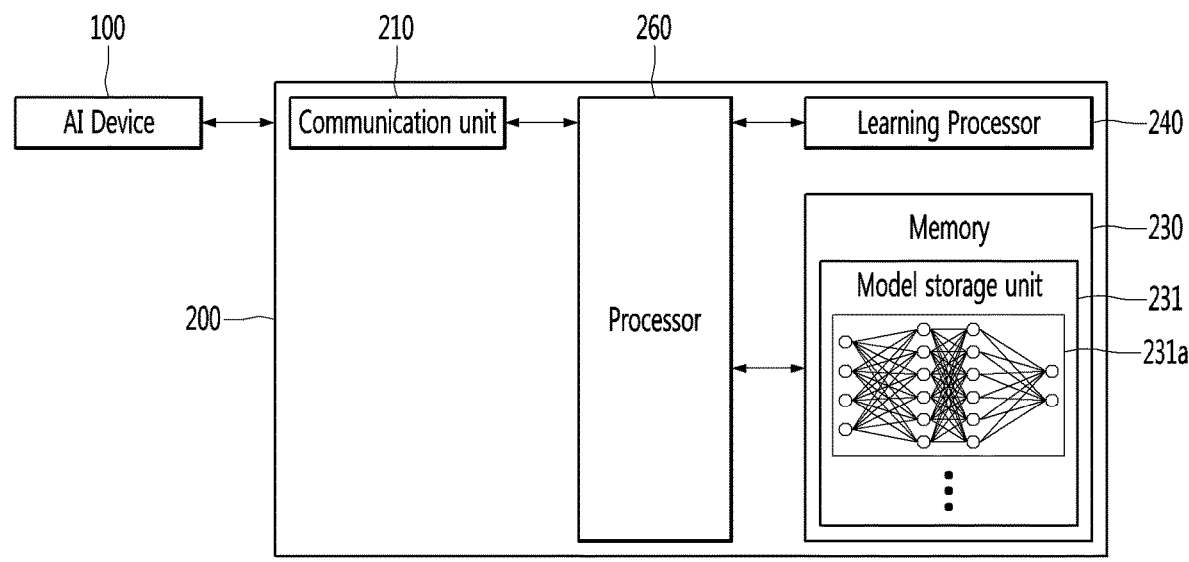
FIG. 2 is a view of an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
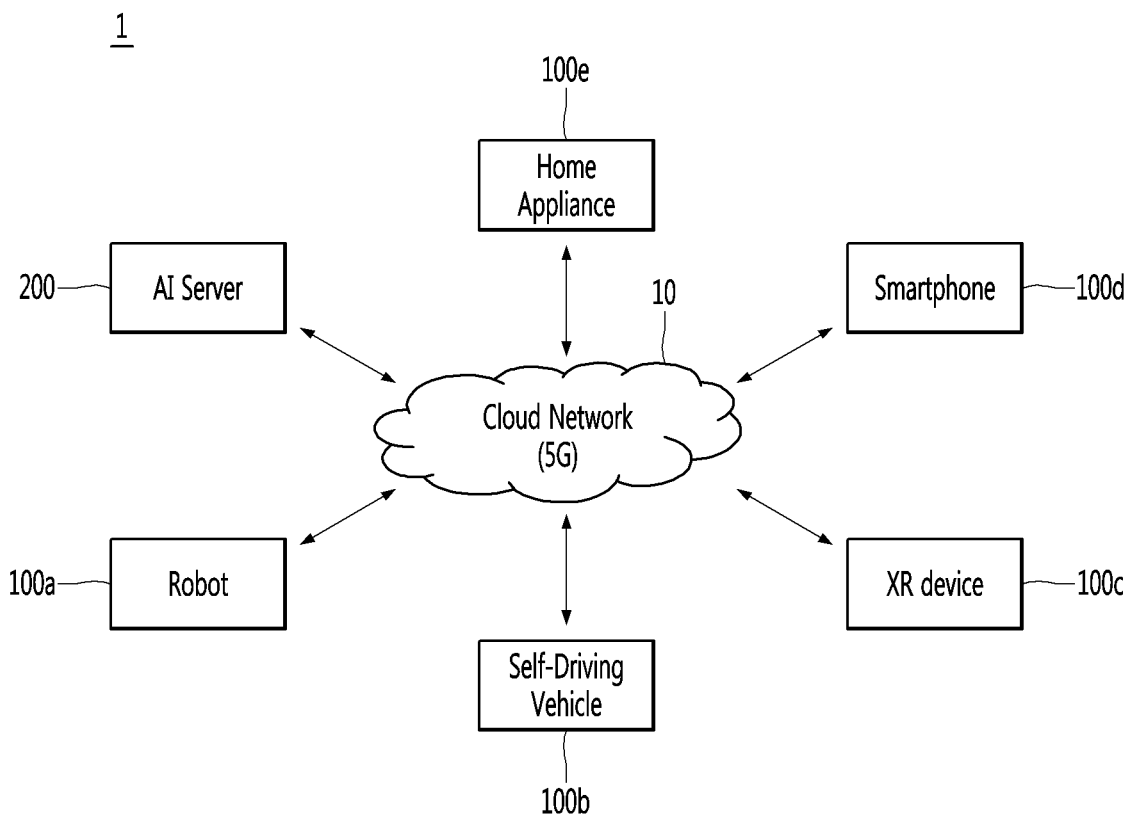
FIG. 3 is a view of an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

\<AI+Robot+XR\>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

\<AI+Self-Driving+XR\>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4A:
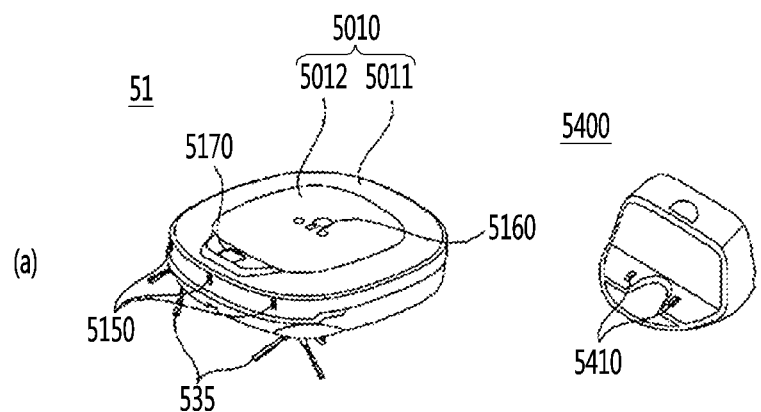
FIG. 4A is a perspective view of a robot cleaner according to an embodiment.
Figure 4A:
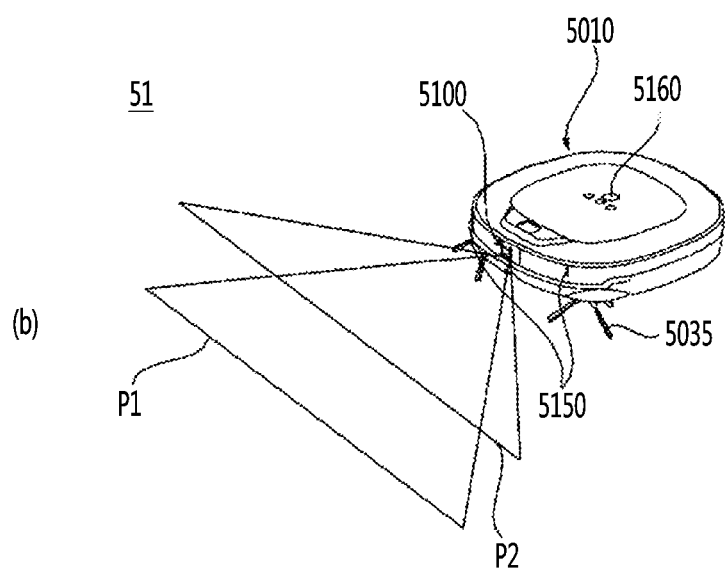
Figure 4B:
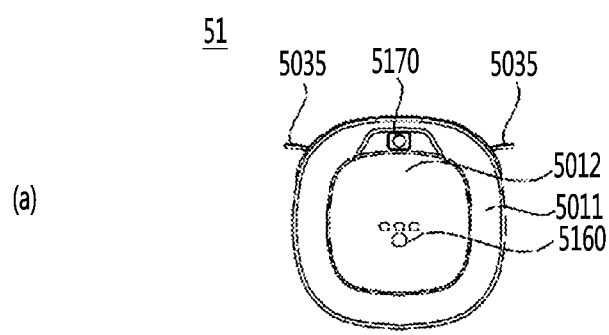
FIG. 4B is a horizontal viewing angle of the robot cleaner of FIG. 4A.
Figure 4B:
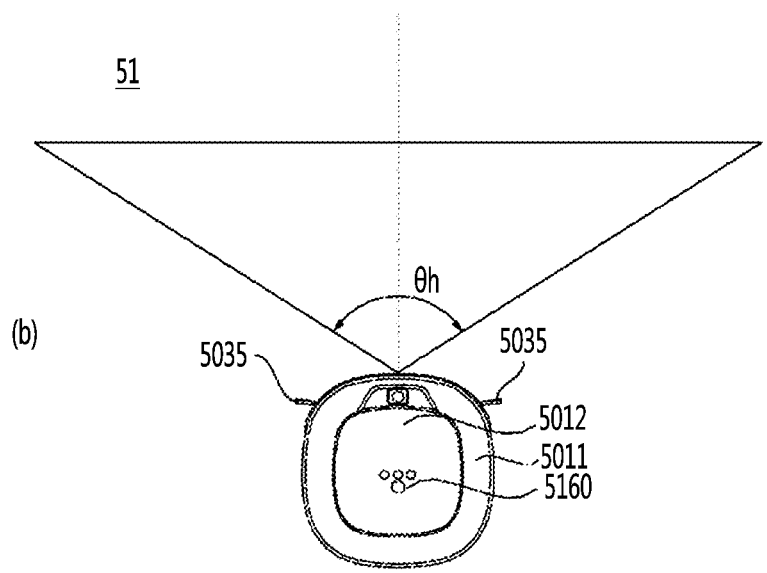
Figure 4C:
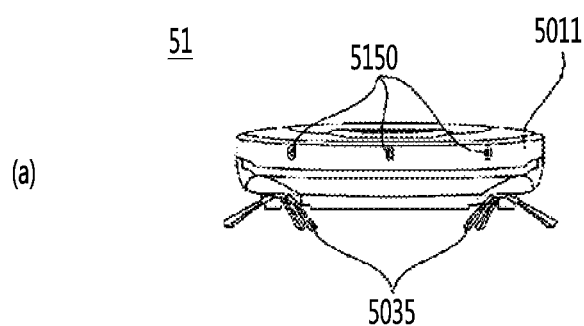
FIG. 4C is a front view of the robot cleaner of FIG. 4A.
Figure 4C:
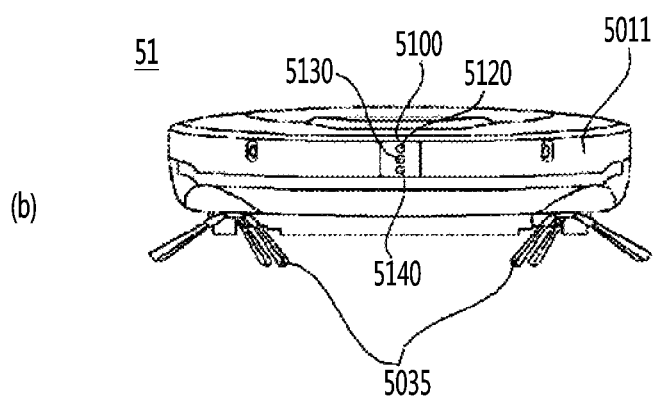
Figure 4D:
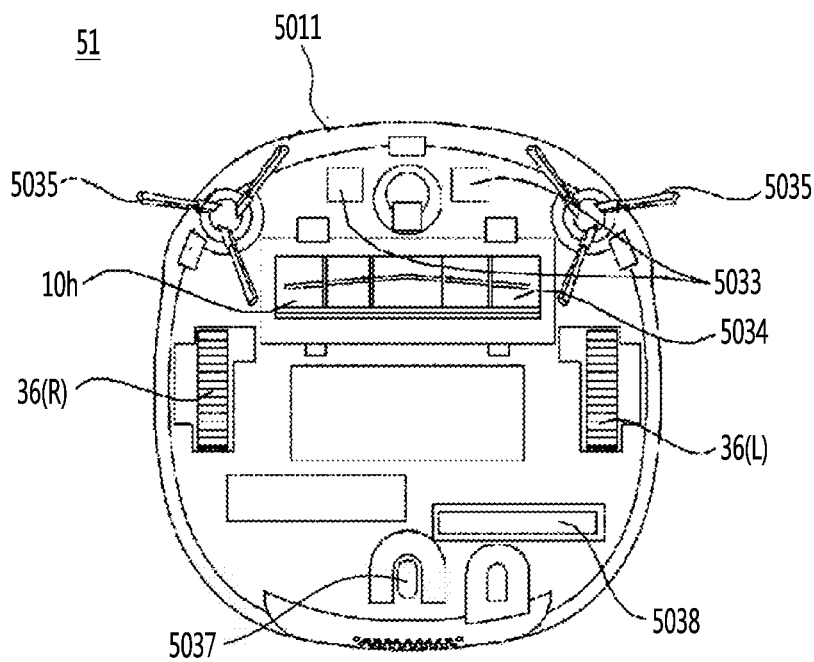
FIG. 4D is a bottom view of the robot cleaner of FIG. 4A.

FIG. 4A is a perspective view of a robot cleaner according to an embodiment. FIG. 4B is a horizontal viewing angle of the robot cleaner of FIG. 4A. FIG. 4c is a front view of the robot cleaner of FIG. 4A. FIG. 4D is a bottom view of the robot cleaner of FIG. 4A.

Referring to FIGS. 4A to 4D, a robot cleaner 51 according to an embodiment may include a main body 5010 suctioning foreign substances such as dusts on a floor while moving along the bottom of a cleaning area and an obstacle detection unit 5100 disposed on a front surface of the main body 5010.

The main body 5010 may include a casing 5011 defining an outer appearance thereof and providing a space in which components constituting the main body 5010 are accommodated therein, a suction unit 5034 disposed in the casing 5011 to suction the foreign substances such as dusts or wastes, and left and right wheels 36(L) and 36(R) rotatably provided on the casing 5011. As the left and right wheels 36(L) and 36(R) rotate, the main body 10 moves along the floor of the cleaning area. In this process, the foreign substances may be suctioned through the suction unit 5034.

The suction unit 5034 may include a suction fan (not shown) generating a suction force and a suction hole 10h through which an air flow generated by rotation of the suction fan is suctioned. The suction unit 5034 may include a filter (not shown) collecting the foreign substances from the air flow suctioned through the suction hole 10h and a collection box (not shown) in which the foreign substances collected by the filter are accumulated.

Also, the main body 5010 may include a traveling driving unit that drives the left wheel 36(L) and the right wheel 36(R). The traveling driving unit may include at least one driving motor. The at least one driving motor may include a left wheel driving motor rotating the left wheel 36(L) and a right wheel driving motor rotating the right wheel 36(R).

The left wheel driving motor and the right wheel driving motor may be independently controlled in operation by a traveling control part of a control unit to allow the main body 5010 to travel forward or backward or rotate. For example, when the main body 5010 travels forward, the left wheel driving motor and the right wheel driving motor rotate in the same direction. On the other hand, when the left wheel driving motor and the right wheel driving motor respectively rotate at different speeds or rotate in different directions, the traveling direction of the main body 5010 may be switched. At least one auxiliary wheel 5037 may be further provided to stably support the main body 5010.

A plurality of brushes 5035 disposed on a front side of the bottom surface of the casing 5011 and including a brush constituted by a plurality of wings extending in a radial direction may be further provided. The dusts may be removed from the floor of the cleaning area by the rotation of the plurality of brushes 5035. Then, the dusts separated from the floor may be suctioned through the suction hole 10h and collected into the collection box.

A control panel including a manipulation unit 5160 receiving various commands for controlling the robot cleaner 51 from the user may be provided on a top surface of the casing 5011.

The obstacle detection unit 5100 may be disposed on the front surface of the main body 5010.

The obstacle detection unit 5100 is fixed to the front surface of the casing 5011 and includes a first pattern irradiation part 5120, a second pattern irradiation part 5130, and an image acquisition part 5140. Here, as illustrated in the drawing, the image acquisition part may be fundamentally installed below the pattern irradiation part. In some cases, the image acquisition part may be disposed between the first and second pattern irradiation parts. Also, a second image acquisition part (not shown) may be further provided on an upper end of the main body. The second image acquisition part captures an image of the upper end of the main body, i.e., an image of a ceiling.

A rechargeable battery 5038 may be provided in the main body 5010. A charging terminal 5033 of the battery 5038 may be connected to a commercial power source (for example, a power outlet in the home), or the main body 5010 may be docked to a separate charging station (not shown) connected to the commercial power source so that the charging terminal 5033 is electrically connected to the commercial power source so as to charge the battery 5038, The electronic components constituting the robot cleaner may receive power from the battery 5038. Thus, in a state in which the battery 5038 is charged, the robot cleaner 51 may travel for oneself in a state of being electrically separated from the commercial power source.

Figure 4E:
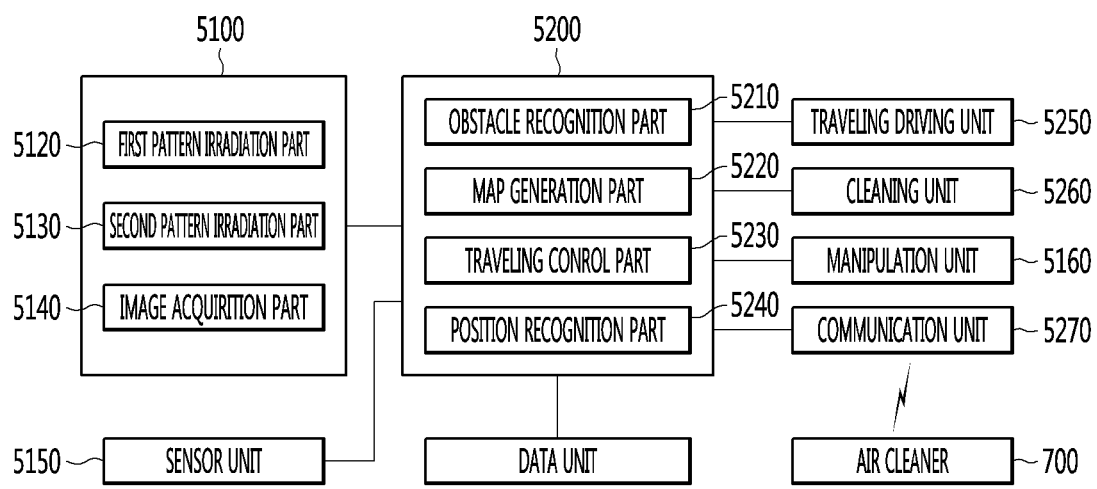
FIG. 4E is a block diagram illustrating main components of the robot cleaner according to an embodiment.

FIG. 4E is a block diagram illustrating main components of the robot cleaner according to an embodiment.

As illustrated in FIG. 4E, the robot cleaner 51 includes a traveling driving unit 5250, a cleaning unit 5260, a data unit 5280, an obstacle detection unit 5100, a sensor unit 5150, a communication unit 5270, a manipulation unit 6160, and a control unit 5200 controlling an overall operation of the robot cleaner 51. The control unit 5200 may be implemented as one or more microprocessor or a hardware device.

The manipulation unit 5160 includes at least one input unit such as a button, a switch, a touch pad, and the like to receive a user's command. As described above, the manipulation unit may be disposed on the upper end of the main body 5010.

The data unit 5280 stores an obstacle detection signal inputted from the obstacle detection unit 5100 or the sensor unit 5150, reference data through an obstacle recognition part 5210 determines an obstacle, and obstacle information on the detected obstacle. Also, the data unit 5280 stores a map containing control data for controlling an operation of the robot cleaner, data according to a cleaning mode of the robot cleaner, and obstacle information generated by a map generation part. The data unit 5280 may store a base map, a cleaning map, a user map, and a guide map. The obstacle detection signal includes a detection signal such as ultrasound/laser by the sensor unit and an acquired image of the image acquisition part.

Also, the data unit 5280 may store data that is readable by a microprocessor and include a hard disk drive (HDD), a solid state disk (SSD), a silicon disk drive (SDD), a ROM, a RAM, a CD-ROM, a magnetic tape, a floppy disk, and an optical data storage device.

The communication unit 5270 communicates with an air cleaner in a wireless communication manner. Also, the communication unit 5270 may be connected to an Internet network through a home network to communicate with an external server or an air cleaner.

The communication unit 5270 transmits the generated map to the air cleaner and transmits data on an operation state and cleaning state of the robot cleaner to the air cleaner. The communication unit 5270 includes a communication module such as Wi-Fi and WiBro as well as short-range wireless communication such as Zigbee and Bluetooth to transmit or receive data.

The traveling driving unit 5250 includes at least one driving motor to allow the robot cleaner to travel according to a control command of the traveling control part 230. As described above, the traveling driving unit 5250 may include a left wheel driving motor rotating the left wheel 36(L) and a right wheel driving motor rotating the right wheel 36(R).

The cleaning unit 5260 operates the brush to easily suction dusts or foreign substances around the robot cleaner and operates the suction device to suction the dusts or foreign substances. The cleaning unit 5260 controls the operation of a suction fan provided in the suction unit 34 that suctions the foreign substances such as dusts or wastes so that the dusts are introduced into a foreign substance collection box through the suction hole.

The obstacle detection unit 5100 includes a first pattern irradiation part 5120, a second pattern irradiation part 5130, and image acquisition part 5140.

The sensor unit 5150 includes a plurality of sensors to assist the detection of the obstacle. The sensor unit 5150 may include at least one of a laser sensor, an ultrasonic sensor, or an infrared sensor. Also, the sensor unit 5150 detects an obstacle in front of the main body 5010, that is, an obstacle in a traveling direction by using at least one of laser, ultrasonic waves, or infrared rays. When the transmitted signal is reflected and incident, the sensor unit 5150 inputs information on whether an obstacle exists or a distance up to the obstacle into the control unit 5200 as an obstacle detection signal.

Also, the sensor unit 5150 includes at least one tilt sensor to detect a tilt of the main body. The tilt sensor calculates a tilted direction and angle when the tilt sensor is tilted in the front, rear, left and right directions. The tilt sensor may be a tilt sensor, an acceleration sensor, or the like, and in the case of the acceleration sensor, any one of a gyro type, an inertial type, and a silicon semiconductor type may be applied.

The sensor unit 5150 may include at least one of the components of the obstacle detection unit 5100 and may perform a function of the obstacle detection unit 5100.

In the obstacle detection unit 5100, the first pattern irradiation part 5120, the second pattern irradiation part 5130, and the image acquisition part 5140 are installed on the front surface of the main body 5010 as described above to emit light P1 and P2 having first and second patterns to a front side of th robot cleaner and photograph the emitted pattern light, thereby acquiring an image.

Also, the sensor unit 5150 may include a dust sensor that detects an amount of dusts in the air and a gas sensor that detects an amount of gas in the air.

The obstacle detection unit 5100 inputs the acquired image into the control unit 5200 as an obstacle detection signal.

The first and second pattern irradiation parts 5120 and 5130 of the obstacle detection unit 5100 may include a light source and an optical pattern projection element (OPPE) that generates a predetermined pattern by transmitting light emitted from the light source. The light source may be a laser diode (LD), a light emitting diode (LED), or the like. Laser light is superior to other light sources in terms of monochromaticity, straightness, and connection characteristics, so that accurate distance measurement is possible. Particularly, since infrared or visible light has a limitation in that a large deviation occurs in the accuracy of distance measurement depending on factors such as a color and material of an object, the laser diode is preferable as the light source. The OPPE may include a lens and a diffractive optical element (DOE). Light having various patterns may be emitted according to a configuration of the OPPE provided in each of the pattern irradiation parts 5120 and 5130.

The first pattern irradiation part 5120 may irradiate light P1 having a first pattern (hereinafter, referred to as first pattern light) toward a front lower side of the main body

5010. Thus, the first pattern light P1 may be incident onto the floor of the cleaning area.

The first pattern light P1 may be configured in the form of a horizontal line Ph. The first pattern light P1 may also be configured in the form of a cross pattern in which the horizontal line Ph intersects a vertical line Pv.

The first pattern irradiation part 5120, the second pattern irradiation part 5130, and the image acquisition part 5140 may be vertically arranged in a line. The image acquisition part 5140 is disposed below the first pattern irradiation part 5120 and the second pattern irradiation part 5130, but is not limited thereto. For example, the image acquisition part 5140 may be disposed above the first pattern irradiation part and the second pattern irradiation part.

In an embodiment, the first pattern irradiation part 5120 is disposed at an upper side to emit the first pattern light P1 downward toward the front side, thereby detect an obstacle disposed below the first pattern irradiation part 5120. The second pattern irradiation part 5130 is disposed at a lower side to emit light P2 having a second pattern (hereinafter, referred to as second pattern light) upward toward the front side. Thus, the second pattern light P2 may be incident onto an obstacle or a predetermined portion of the obstacle that is disposed at a position higher than the second pattern irradiation part 5130 from a wall or the floor of the cleaning area.

The second pattern light P2 may have a pattern different from the first pattern light P1 and preferably includes a horizontal line. Here, the horizontal line does not have to be a continuous line segment, but may be provided as a dotted line.

In FIG. 2 shown above, the displayed irradiation angle θh indicates a horizontal irradiation angle of the first pattern light P1 emitted from the first pattern irradiation part 5120 and indicates an angle between each of both ends of the horizontal line Ph and the first pattern irradiation part 5120. The irradiation angle θh may be preferably determined in a range of about 130° to about 140°, but is not necessarily limited thereto. The dotted line shown in FIG. 2 is directed toward the front side of the robot cleaner 51, and the first pattern light P1 may be configured to be symmetrical with respect to the dotted line.

Like the first pattern irradiation part 5120, the second pattern irradiation part 5130 may also have a horizontal irradiation angle, preferably, in a range of about 130° to about 140°. According to an embodiment, the second pattern light P2 may be emitted at the same horizontal irradiation angle as the first pattern irradiation part 5120. In this case, the second pattern light P1 may also be configured to be symmetrical with respect to the dotted line shown in FIG. 2.

The image acquisition part 5140 may acquire an image of the front side of the main body 5010. The pattern light P1 and P2 appear on an image acquired by the image acquisition part 5140 (hereinafter, referred to as an acquired image). Hereinafter, the images of the pattern light P1 and P2 appearing on the acquired image are referred to as light pattern. This is done because the pattern light P1 and P2 incident into an actual space are substantially images formed on an image sensor, the same reference numerals as the pattern light P1 and P2 are assigned to the first and second pattern light P1 and P2, and thus, the images respectively corresponding to the first pattern light P1 and the pattern light P2 will be referred to as a first light pattern P1 and a second light pattern P2.

The image acquisition part 5140 may include a digital camera that converts an image of an object into an electrical signal and then converts the image into a digital signal and stores the image in a memory device. The digital camera may include an image sensor (not shown) and an image processing unit (not shown).

An image sensor is a device that converts an optical image into an electrical signal and is provided in the form of a chip in which a plurality of photo diodes are integrated. For example, a pixel may be the photo diode. Charges are accumulated in each pixel by an image formed on the chip by light passing through the lens, and the charges accumulated in the pixels are converted into electrical signals (e.g., voltages). A charge coupled device (CCD), a complementary metal oxide semiconductor (CMOS), and the like are well known as the image sensor.

The image processing unit generates a digital image based on an analog signal outputted from the image sensor. The image processing unit includes an AD converter that converts an analog signal into a digital signal, a buffer memory that temporarily records digital data according to the digital signal outputted from the AD converter, and a digital signal processor (DSP) that processes information recorded in the buffer memory to form a digital image.

The control unit 5200 includes an obstacle recognition part 5210, a map generation part 5220, a traveling control part 5230, and a position recognition part 5240.

The obstacle recognition part 5210 determines an obstacle through an acquired image inputted from the obstacle detection unit 5100, and the traveling control part 5230 controls the traveling driving unit 5250 to change a moving direction or a travel route in response to the obstacle information so as to pass through the obstacle or to avoid the obstacle.

The traveling control part 5230 controls the traveling driving unit 5250 to independently control the operation of the left wheel driving motor and the right wheel driving motor so that the main body 5010 straightly moves or rotates to travel.

The obstacle recognition part 5210 stores the obstacle detection signal inputted from the sensor unit 5150 or the obstacle detection unit 5100 in the data unit 5280 and analyzes the obstacle detection signal to determine the obstacle.

The obstacle recognition part 5210 determines whether there is an obstacle in front of the sensor based on the signal of the sensor unit and analyzes the acquired image to determine a position, size, and shape of the obstacle.

The obstacle recognition part 5210 extracts a pattern by analyzing the acquired image. The obstacle recognition part 5210 extracts a light pattern that appears when the pattern light emitted from the first pattern irradiation part or the second pattern irradiation part is emitted onto the floor or the obstacle and determines the obstacle based on the extracted light pattern.

The obstacle recognition part 5210 detects the light patterns P1 and P2 from the image (acquired image) acquired by the image acquisition part 5140. The obstacle recognition part 5210 may detect a feature such as a point, a line, a surface, or the like with respect to predetermined pixels constituting the acquired image and detect points, lines, planes, and the like constituting the patterns P1 and P2 or the light patterns P1 and P2 based on the detected feature.

The obstacle recognition part 5210 may extract line segments formed by successive pixels that are brighter than the surroundings and extract the horizontal line Ph forming the first light pattern P1 and the horizontal line forming the second light pattern P2. Since various techniques for extracting a pattern having a desired shape from the digital image are already known, the obstacle recognition part 5210 may extract the first light pattern P1 and the second light pattern P2 by using the known techniques.

The obstacle recognition part 5210 determines whether an obstacle exists based on the detected pattern and determines a shape of the obstacle. The obstacle recognition part 5210 may determine the obstacle through the first light pattern and the second light pattern and calculate a distance up to the obstacle. The obstacle recognition part 5210 may determine a size (height) and a shape of the obstacle by changing the shapes of the first light pattern and the second light pattern and the light pattern that appears during the approach of the obstacle.

The obstacle recognition part 5210 determines the obstacle with respect to the first and second light patterns based on the distance from a reference position. When the first light pattern P1 appears at a position lower than the reference position, the obstacle recognition part 5210 may determine that a downhill slope exists and determine that a cliff exists when the first light pattern P1 disappears. When the second light pattern appears, the obstacle recognition part 5210 may determine an obstacle at the front side or an obstacle at the upper side.

The obstacle recognition part 5210 determines whether the main body is tilted based on the tilt information inputted from the tilt sensor of the sensor unit 5150. When the main body is tilted, the tilt is compensated for the position of the light pattern of the acquired image.

The traveling control part 5230 controls the traveling driving unit 5250 to perform cleaning while traveling with respect to a designated area of the cleaning area and controls the cleaning unit 5260 to perform the cleaning by suctioning dusts during the traveling.

The traveling control part 5230 controls the traveling driving unit 5250 by setting a travel route so that the robot cleaner travels to approach the obstacle, passes through the obstacle, or avoids the obstacle by determining whether to travel or enter in response to the obstacle recognized by the obstacle recognition part 5210.

The map generation part 5220 generates a map of the cleaning area based on the information on the obstacle determined by the obstacle recognition part 5210.

The map generation part 5220 generates a map for the cleaning area based on the obstacle information while traveling on the cleaning area when the map for an initial operation or the cleaning area is not stored. The map generation part 5220 updates the pre-generated map based on the obstacle information acquired during the traveling.

The map generation part 5220 generates a base map based on the information acquired by the obstacle recognition part 5210 during the traveling and generates a cleaning map by distinguishing an area from the base map. The map generation part 5220 generates a user map and a guide map by arranging the area with respect to the cleaning map and setting the attributes of the area.

The base map is a map in which the shape of the cleaning area required through the traveling is displayed as an outline, and the cleaning map is a map in which an area is divided within the base map. The base map and the cleaning map include information on the traveling area and obstacle information of the robot cleaner. The user map is a map that has a visual effect by simplifying an area of the cleaning map and arranging the outlines. The guide map is a superimposed map of the clean map and the user map. Since the cleaning map is displayed on the guide map, a cleaning command may be inputted based on an area in which the robot cleaner actually travels.

After generating the base map, the map generation part 5220 may divide the cleaning area into a plurality of areas, include a connection passage connecting the plurality of areas to each other, and generate a map including information on obstacles within each area. The map generation part 5220 generates a map in which the areas are divided by dividing the small areas to distinguish the areas on the map, setting the representative areas, and setting the separated small areas as separate detailed areas and merging the areas into the representative areas.

The map generation part 5220 processes a shape of the area with respect to each divided area. The map generation part 5220 sets attributes of the divided areas and processes the shapes of the areas according to the attributes for each area.

The map generation part 5220 determines the main area first in each of the divided areas based on the number of contact points with other areas. The main area is basically a living room, but in some cases, the main area may be changed to any one of a plurality of rooms. The map generation part 5220 sets attributes of the remaining area based on the main area. For example, the map generation part 5220 may set an area having a predetermined size or more arranged around the living room, which is the main area, as a room, and set other areas as other areas.

In the processing of the shape of the area, the map generation part 5220 processes each area to have a specific shape depending on a criterion according to the attributes of the area. For example, the map generation part 5220 processes the shape of the area based on a shape of a general home room, for example, a quadrangle. Also, the map generation part 5220 expands the shape of the area based on the outermost cell of the base map and processes the shape of the area by deleting or reducing the area of the area that is inaccessible due to the obstacle.

Also, in the base map, the map generation part 5220 may display an obstacle, which has a size greater than a predetermined size, on the map according to the sizes of the obstacles and delete an obstacle, which has a size less than that of the predetermined cell, so as not to display the obstacle. For example, the map generation part displays furniture on a map, such as a chair or a sofa having a predetermined size and deletes an obstacles, for example, a small toy, and the like, which appear temporarily. The map generation part 5220 stores a position of the charging station together on the map when the map is generated.

After the map is generated, the map generation part 5220 may add an obstacle on the map based on the obstacle information inputted from the obstacle recognition part 21 with respect to the detected obstacle. The map generation part 5220 adds an obstacle to the map when a specific obstacle is repeatedly detected at a fixed position and ignores the obstacle when the obstacle is temporarily detected.

The map generation part 5220 generates both the user map that is a processed map and the guide map in which the user map and the cleaning map are displayed to overlap each other.

When a virtual wall is set, the map generation part 5220 sets a position of the virtual wall on the cleaning map based on data about the virtual wall received through the communication unit and calculates coordinates of the virtual wall corresponding to the cleaning area. The map generation part 5220 registers the virtual wall as an obstacle on the cleaning map.

The map generation part 5220 stores data about the set virtual wall, for example, information about a level of the virtual wall and the attributes of the virtual wall.

The map generation part 5220 enlarges the set virtual wall and registers the virtual wall as an obstacle. During the traveling, the main body 5010 is set to a wider range by enlarging the virtual wall set so as not to contact or invade the virtual wall.

If the map generation part 5220 does not determine the current position of the main body 5010 by the position recognition part 5240, the map generation part 5220 generates a new map for the cleaning area. The map generation part 5220 may determine that the map generation part 5220 moves to a new area and initialize the preset virtual wall.

When the map generation part 5220 receives data on the virtual wall during the traveling, the map generation part 5220 further sets the virtual wall on the map to operate corresponding to the virtual wall when the main body 5010 travels. For example, when the new virtual wall is added, or the level or attribute of the virtual wall is changed, and when the position of the preset virtual wall is changed, the map generation part 5220 updates the map based on the received data. Then, the information about the changed virtual wall is reflected to the map.

The position recognition part 5240 determines the current position of the main body 5010 based on the maps (the cleaning map, the guide map, or the user map) stored in the data unit.

When the cleaning command is inputted, the position recognition part 5240 determines whether the current position of the map matches the current position of the main body, and if the current position does not match the position on the map, or if the current position is not confirmed, the current position of the robot cleaner 51 is recovered by recognizing the current position. The traveling control part 5230 controls the traveling driving unit to move to the designated area based on the current position when the current position is restored. The cleaning command may be inputted from a remote controller (not shown), the manipulation unit 5160, or the air cleaner.

If the current position does not match the position on the map, or the current position is not confirmed, the position recognition part 5240 analyzes the acquired image inputted from the image acquisition part 5140 to estimate the current position based on the map.

The position recognition part 5240 processes the acquired image acquired at each position while the map is generated by the map generation part 5220 to recognize the entire position of the main body in association with the map.

The position recognition part 5240 uses the acquired image of the image acquisition part 5140 to compare the acquired image with respect to each position on the map and grasps the current position of the main body, even when the position of the main body suddenly changes. Thus, the current position may be estimated and recognized.

The position recognition part 5240 analyzes various features disposed on the ceiling, such as lights, edges, corners, blobs, and ridges contained in the acquired image. The acquired image may be inputted from the image acquisition part or the second image acquisition part provided at the upper end of the main body.

The position recognition part 5240 detects a feature from each of the acquired images. Various methods of detecting features from an image are well known in the fields of computer vision technology. Several feature detectors are known that are suitable for the detection of the features. For example, the feature detector may include Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Gray-level blobs detectors.

The position recognition part 5240 calculates a descriptor based on each feature point. The position recognition part 5240 may convert the feature point into the descriptor by using a scale invariant feature transform (SIFT) technique for the feature detection. The descriptor may be expressed as an n-dimensional vector. The SIFT may detect an invariant feature with respect to a scale, rotation, and brightness change of a target to be photographed. Thus, even if the same area is photographed with different postures of the robot cleaner 51 (that is, rotation invariant (Rotation-invariant) feature may be detected. Of course, other various techniques (e.g., Histogram of Oriented Gradient (HOG), Haar feature, Fems, Local Binary Pattern (LBP), Modified Census Transform (MCT), and the like) may be applied.

The position recognition part 5240 classifies at least one descriptor into a plurality of groups according to a predetermined sub-classification rule for each acquired image based on descriptor information obtained through the acquired image of each position and converts each of descriptors included in the same group into a sub-representative descriptor according to the predetermined sub-representative rule. As another example, all the descriptors gathered from the acquired images on a predetermined area, such as a room, are classified into a plurality of groups according to a predetermined sub-classification rule to convert each of the descriptors included in the same group into a sub-representative descriptor according to the predetermined sub-representative rule.

The position recognition part 5240 may obtain a feature distribution of each position through the above process. Each positional feature distribution may be represented by a histogram or an n-dimensional vector. As another example, the learning module 143 may estimate an unknown current position based on the descriptor calculated from each feature point without passing through the predetermined sub-classification rule and the predetermined sub-representative rule.

In the case in which the current position of the robot cleaner 51 becomes in an unknown state due to a position leap or the like, the position recognition part 5240 may estimate the current position based on the data stored in the pre-stored descriptor or the sub-representative descriptor.

The position recognition part 5240 acquires an acquired image through the image acquisition part 5140 at the unknown current position, and then, when the various features such as the lights, the edges, the corners, and the blobs positioned on the ceiling are confirmed through the image, the features are detected from the acquired image.

The position recognizing unit 5240, based on at least one recognition descriptor information obtained through the acquired image of the unknown current position, position information to be compared according to a predetermined sub-conversion rule (for example, feature distribution of each position) and information that is capable of being compared with (sub-recognition feature distribution). According to a predetermined sub-comparison rule, each position feature distribution may be compared with each recognition feature distribution to calculate each similarity. The similarity (probability) may be calculated for each position corresponding to each position, and the position at which the greatest probability is calculated may be determined as the current position.

When the map is updated by the map generation part 5220 during the traveling, the control unit 5200 transmits the updated information to the air cleaner 300 through the communication unit, and thus the maps stored in the air cleaner 300 and the robot cleaner 51 are the same.

When the cleaning command is inputted, the traveling control part 5230 controls the traveling driving unit to move to the designated area among the cleaning areas and operates the cleaning unit to perform the cleaning during the traveling.

When the cleaning command for the plurality of areas is inputted, the traveling control part 5230 moves along the areas according to whether the priority area is set or in a designated order to perform the cleaning. When a specific order is not designated, the traveling control part 5230 moves to the nearest or adjacent area based on the current position to perform the cleaning.

When the cleaning command for a certain area is inputted regardless of the area classification, the traveling control part 5230 moves to the area included in the arbitrary area to perform the cleaning.

When the virtual wall is set, the traveling control part 5230 determines the virtual wall and controls the traveling driving unit based on the coordinate value inputted from the map generation part 5220.

Even if it is determined that the obstacle does not exist by the obstacle recognition part 5210, the traveling control part 5230 recognizes that the obstacle exists at the corresponding position to restrict the traveling when the virtual wall is set.

When the traveling control part 5230 changes the setting of the virtual wall during the traveling, the traveling control part 5230 classifies a traveling possible area and a non-traveling area according to the changed virtual wall setting to reset the travel route.

The traveling control part 5230 controls the traveling in response to any one of a setting 1 for the noise, a setting 2 for the travel route, a setting 3 for the avoidance, and a setting 4 for the security according to the attribute set on the virtual wall.

The traveling control part 5230 may access the virtual wall to perform the designated operation according to the attributes of the virtual wall (the travel route, the setting 2) or reduce and clean the noise generated from the main body (the noise, the setting 1), travel to avoid the virtual wall without approaching the virtual wall more than a certain distance (the avoidance, the setting 3), and photograph an image of a predetermined area based on the virtual wall (the security, the setting 4).

When the cleaning of the set designated area is completed, the control unit 5200 stores the cleaning record in the data unit.

Also, the control unit 5200 transmits an operation state or a cleaning state of the robot cleaner 51 to the air cleaner through the communication unit 190 at a predetermined cycle.

Based on the data received from the robot cleaner 51, the air cleaner displays the position of the robot cleaner together with a map on the screen of an executive application and also outputs information on the cleaning state.

When the information on the obstacle is added, the air cleaner may update the map based on the received data.

When the cleaning command is inputted, the robot cleaner may travel by dividing the travelable area and the traveling impossible area based on the information of the set virtual wall.

The sensor unit 5150 may include a camera. Also, the control unit 5200 may acquire an image of the indoor space by controlling the camera to photograph the indoor space.

The sensor unit 5150 may include at least one of a laser sensor, an ultrasonic sensor, an infrared sensor, or a camera. In addition, the sensor unit 5150 may generate a map of an indoor space by using at least one of an image photographed by a laser, a ultrasonic wave, an infrared ray, or a camera.

Also, the sensor unit 5150 may include a temperature sensor for measuring a temperature of the indoor space, a first heat detection sensor (e.g., an infrared sensor) for detecting a body temperature of the user, and a second heat detection sensor for detecting heat information such as an operation state of a gas range or an electric range or heat generated by electronic products.

Also, the sensor unit 5150 may include a microphone that receives sound.

Also, the sensor unit 5150 may include a dust sensor that detects an amount of dusts in the air and a gas sensor that detects an amount of gas in the air.

Figure 5A:
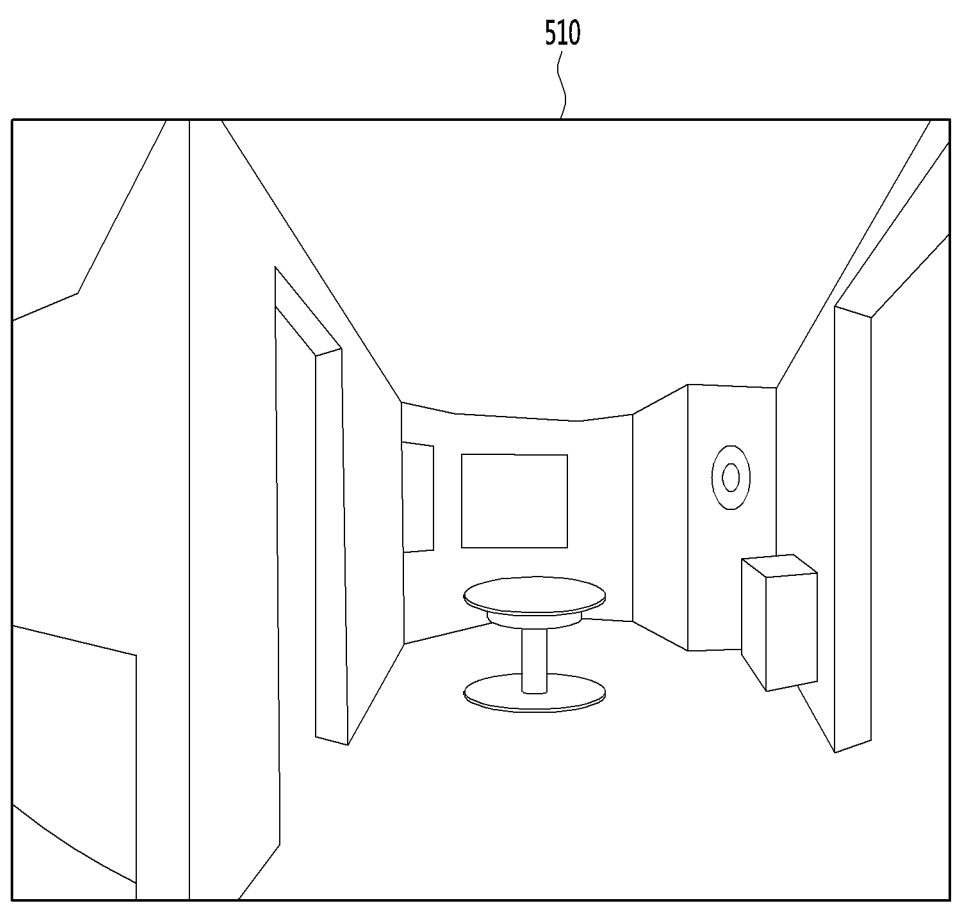
FIGS. 5A-5C are views for explaining a method for generating a map of an indoor space according to an embodiment.
Figure 5B:
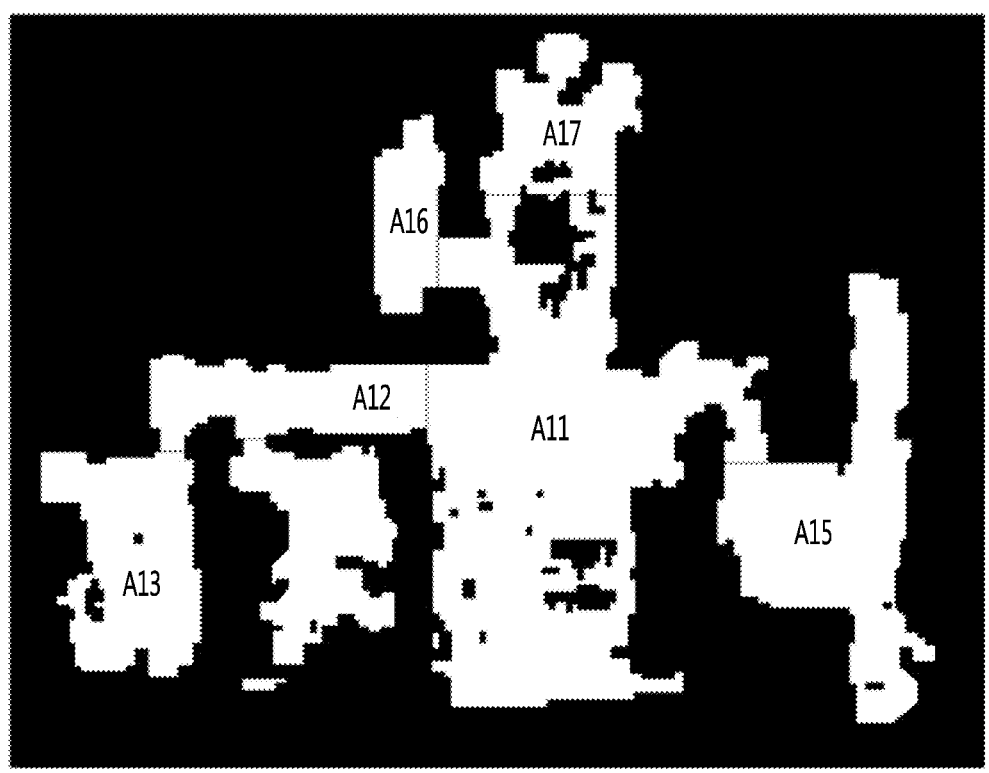
Figure 5C:

FIGS. 5A to 5C are views for explaining a method for generating the map of the indoor space according to an embodiment.

Hereinafter, the term "robot cleaner" may be used interchangeably with the term "moving agent".

The moving agent may move in the indoor space and collect information for generating a map of the indoor space.

For example, as illustrated in FIG. 5A, the moving agent may move in the indoor space and photograph a plurality of images 510 by using a camera. However, the image is only one example of information for generating the map of the indoor space, and the moving agent may collect sensing information for generating the map of the indoor space using radar, infrared rays, and ultrasonic waves.

The moving agent may acquire an image of an air conditioner disposed in the indoor space.

The moving agent may generate the map of the indoor space by using the collected information.

For example, as illustrated in FIG. 5B, the moving agent may generate a map constituted by outlines of the indoor space. In this case, the map may be divided into a plurality of zones A11 to A17, for example, a living room, a room 1, a room 2, and the like.

The moving agent may acquire an image of the air conditioner disposed in the indoor space and display a position and direction of the air conditioner on the map based on the image of the air conditioner.

The map of the indoor space may include a processed map.

Particularly, the moving agent may generate the processed map that simplifies a structure of the indoor space by using the map of the indoor space to facilitate recognition of the structure of the indoor space.

More particularly, the moving agent may simplify the shape of the area to clean up obstacles or straighten the wall.

The moving agent may display the position and direction of the air conditioner on the processed map.

The control unit 200 of the moving agent may transmit feature information related to the structure of the indoor space to the air conditioner 700 through the communication unit 270. Here, the feature information may include information collected through the sensor unit 150 to generate the map of the indoor space, a map generated using the information collected through the sensor unit 150, or a processed map in which the structure of the indoor space is simplified.

The processor 780 of the air conditioner 700 may receive the feature information related to the structure of the indoor space, which is obtained by the moving agent through the communication unit 710.

When the information collected to generate the map of the indoor space is received as the feature information, the processor 780 of the air conditioner 700 uses the collected information to generate the map of the indoor space. In this case, the above-described method by which the moving agent generates the map may be used.

The robot cleaner 51 may include the constituents of the above-described AI device 100 and the learning device 200 and perform the corresponding functions.

Also, the term "robot cleaner 51" may be used interchangeably with the term "AI robot cleaner 51".

Figure 6:
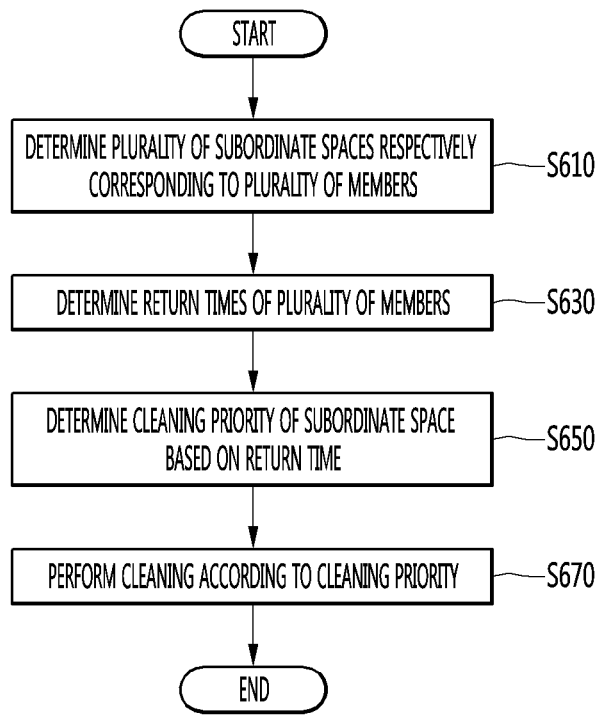
FIG. 6 is a view for explaining an operation method of the robot cleaner according to an embodiment.

FIG. 6 is a view for explaining an operation method of the robot cleaner according to an embodiment.

An operation method of a robot cleaner may include determining (S610) one or more subordinate spaces corresponding to each of a plurality of members among a plurality of subordinate spaces by using data for identifying the plurality of members and a map of an indoor space, determining (S630) a return time of some or all of the members, determining (S650) a cleaning priority of the plurality of subordinate spaces based on the return time, and controlling (S670) a traveling driving unit and a cleaning unit to perform cleaning according to the cleaning priority.

Figure 7:
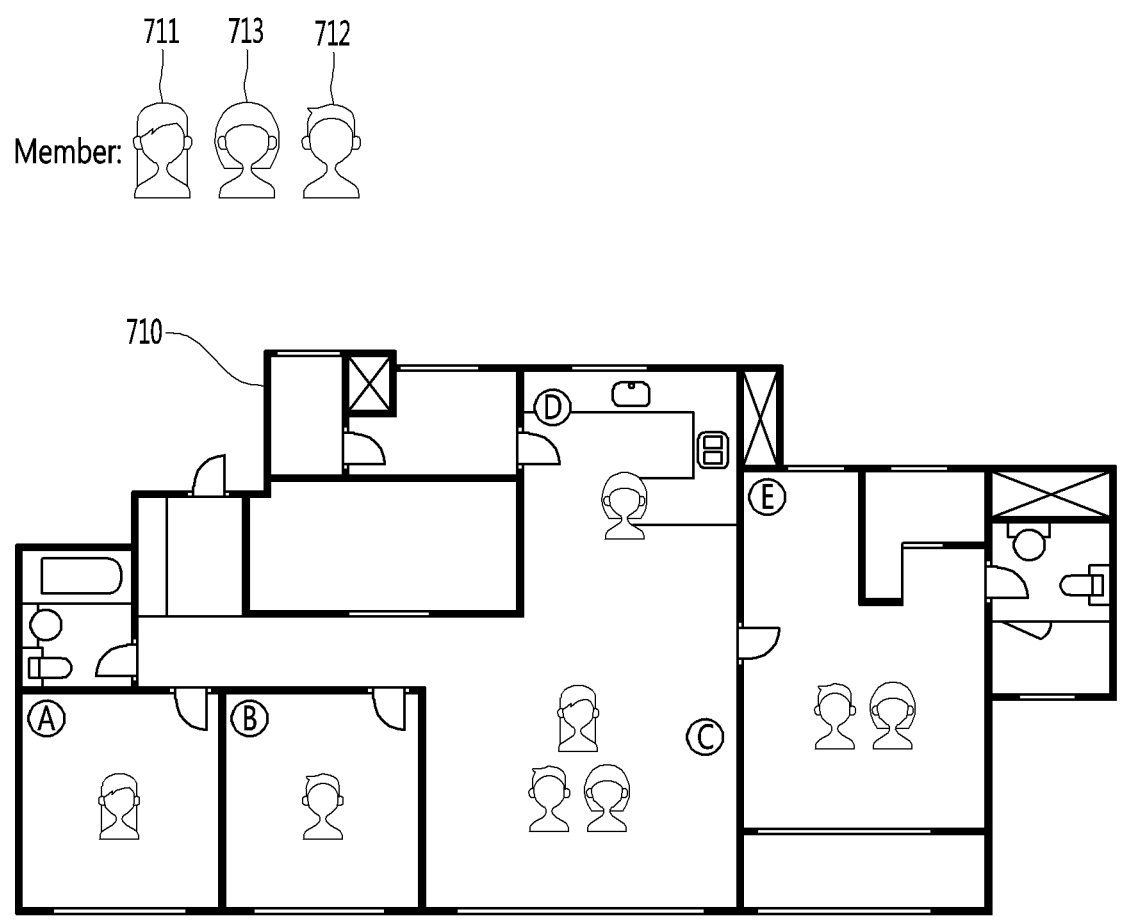
FIG. 7 is a view for explaining a method for determining one or more subordinate spaces corresponding to a plurality of members according to an embodiment.

FIG. 7 is a view for explaining a method for determining one or more subordinate spaces corresponding to a plurality of members according to an embodiment.

A sensing unit of the robot cleaner may acquire data for identifying the members. Particularly, a camera may acquire an image obtained by capturing an image of an indoor space. Also, a microphone may acquire sounds collected in the indoor space.

Although only images and sounds are described, but not limited thereto. For example, all data capable of being used to identify the members may be collected.

A processor of the robot cleaner may identify at least one member of the plurality of members by using the data for identifying the member.

Particularly, the processor may distinguish a plurality of members based on a size, appearance, behavior pattern, voice in the received sound, etc. of the person in the captured image. The method of identifying the members may be the conventional technology, and thus, a detailed description thereof will be omitted.

Meanwhile, the identification of the members that are present in the indoor space may be performed by a recognition model.

Particularly, the recognition model may be a neural network that has been pre-trained to classify gender, generation (infant, child, teenager, youth, mature, elderly, etc.) In this case, the training data may be data for identifying the above-described members such as the video or the audio.

Also, when the data for identifying the members is received, the processor 180 may input the data for identifying the members into the recognition model. In this case, as the recognition model outputs a result value of classifying the members according to gender, generation, etc., the processor 180 may identify the members present in the indoor space.

The processor may determine one or more subordinate spaces corresponding to each of the plurality of members of the plurality of subordinate spaces by using the data for identifying the members and the map of the indoor space.

Particularly, the processor may divide the indoor space 710 into a plurality of subordinate spaces A, B, C, D, and E by using a layout and structure of the indoor space.

For example, when the first subordinate space A is surrounded by a wall, and a door exists, the processor may determine that the first subordinate space A exists in the indoor space 710.

Also, the processor may determine one or more subordinate spaces corresponding to the members.

For example, the processor may determine that the subordinate space corresponding to a first member 711 (daughter) is the first subordinate space A.

For another example, the processor may determine that the subordinate space corresponding to a second member 712 (mother) is the second subordinate space B, the third subordinate space C, and the fifth subordinate space E.

For another example, the processor may determine that the subordinate space corresponding to a third member 713 (father) is the third subordinate space C, the fourth subordinate space D, and the fifth subordinate space E.

The subordinate space corresponding to the member may mean a space frequently used by the member among the indoor spaces.

For example, when the teenage daughter is locked only in his room, the subordinate space of the teenage daughter may be the first subordinate space A (small room).

For another example, if the mother sleeps in the room, watches TV in the living room, and cooks in the kitchen frequently, the mother's subordinate space is the third subordinate space C (living room), the fourth subordinate space D (kitchen), and the fifth subordinate space E (main room).

For further another example, if the father sleeps in the room, watches TV in the living room, and often reads books in the library, father's subordinate spaces are the second subordinate space B (study), the third subordinate space C (living room), and the fifth subordinate space E (main room).

The processor may use the data for identifying the member to identify the member and then determine one or more subordinate spaces corresponding to the member.

Particularly, the processor may determine one or more subordinate spaces corresponding to the member based on at least one of a time or frequency at which the member is disposed within the subordinate space.

For example, the processor may receive a voice through the microphone and use the received voice to determine who is the talker. Also, then the voice of the first member 711 is detected a predetermined number or more of times in a first period in the first subordinate space A, the processor may determine the first subordinate space A as the subordinate space corresponding to the first member 711.

For another example, the processor may receive an image through the camera and use the received image to determine who is photographed in the image. Also, when the first member 711 is photographed a preset number or more of times in the first subordinate space A, the processor may determine the first subordinate space A as the subordinate space corresponding to the first member 711.

For another example, the processor may control the camera and the traveling driving unit to track and photograph the first member 711. When the first member 711 enters the first subordinate space A a predetermined number or more of times in a predetermined period, the processor may determine the first subordinate space A as the subordinate space corresponding to the first member 711.

Similarly, the processor may determine the second subordinate space B (study), the third subordinate space C (living room), and the fifth subordinate space E (main room) as the subordinate spaces for the second member 712 (father).

Also, the processor may determine the third subordinate space C (living room), the fourth subordinate space D (kitchen), and the fifth subordinate space E (main room) as the subordinate space for the third member 713 (mother).

The processor may determine the return time of some or all of the plurality of members.

The processor may determine the return time of some or all of the plurality of members based on at least one of schedule information of the plurality of members, a return pattern of the plurality of members, or a conversation of the plurality of members.

In relation to the schedule information, the processor may communicate with terminals of the plurality of members. Also, the processor may receive the schedule information of the plurality of members from the terminals of the plurality of members.

For example, the processor may receive the schedule information created by the user using a schedule application from the mobile phones of the plurality of members. Also, the processor may determine the return time of some or all of the plurality of members using the schedule information of the plurality of members.

In relation to the return pattern, the processor may acquire the return pattern of the plurality of members by using the data for identifying the plurality of members. For example, if the third user 713 is identified in the indoor space from 3 pm on Monday, Wednesday, and Friday, the processor may acquire a return pattern of the third user that the third user 713 returns home at 3 pm on Monday, Wednesday, and Friday. Also, the processor may determine the return time of some or all of the plurality of members using the return pattern of the plurality of members.

In connection with the member's conversation, the processor may receive the member's voice conversation in the indoor space through the microphone.

Also, the processor may receive the member's conversation using the terminal from the terminal through the communication unit. Here, the member's conversation using the terminal may include at least one of a voice conversation during a call and a text conversation using a messenger application.

Also, the processor may determine the return time of some or all of the plurality of members based on at least one of the voice conversation received through the microphone, the voice conversation during the call received through the communication unit, or the text conversation received through the communication unit.

When the third member 713 utters "I will be back at about 7" in the indoor space, the processor may determine that the third member 713 comes back at 7.

The processor may determine the cleaning priority of the plurality of subordinate spaces based on the return time.

This will be described below in with reference to FIGS. 8 to 9.

Figure 9:
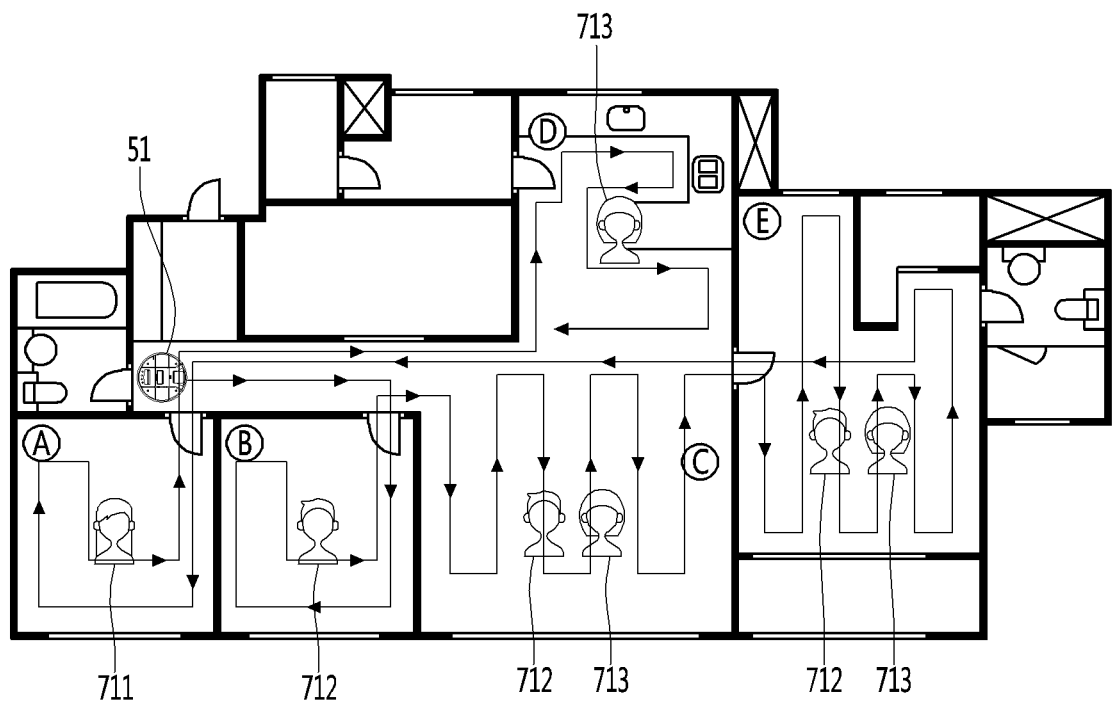
FIG. 9 is a view for explaining a method for determining a priority according to a return time according to an embodiment.

FIG. 9 is a view for explaining an order of general cleaning.

The processor may clean the plurality of subordinate spaces according to a preset cleaning priority.

Here, the preset cleaning priority may be an order in which the moving path of the robot cleaner is minimized. That is, the preset cleaning priority may be an order in which the cleaning is started at a standby position of the robot cleaner, and the cleaning is completed by moving the shortest distance.

Figure 8:
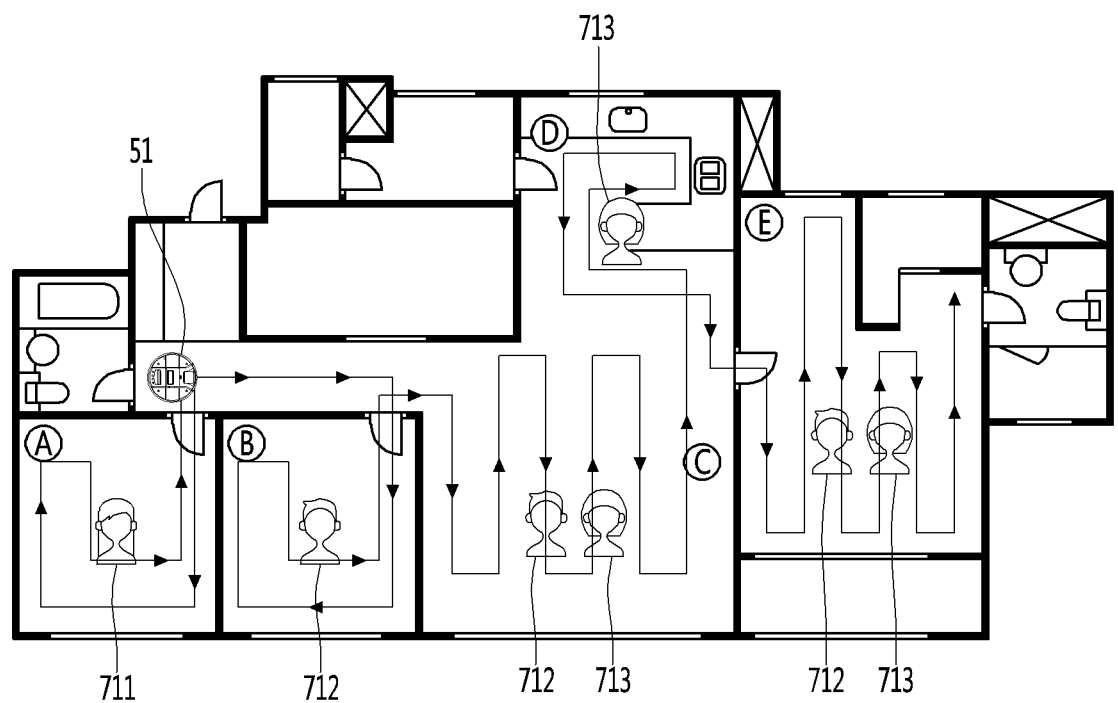
FIG. 8 is a view for explaining an order of general cleaning.

For example, referring to FIG. 8, the robot cleaner 51 waiting at the standby position and the moving path of the robot cleaner 51 are illustrated.

In order to minimize the movement path of the robot cleaner, the order may be set to following order: the first subordinate space A->the first subordinate space A->the second subordinate space B->the third subordinate space C->the fourth subordinate space D->the fifth subordinate space (E). Thus, the processor may control the traveling driving unit so that the cleaning is performed according to the preset cleaning priority, i.e., the first subordinate space A, the first subordinate space A, the second subordinate space B, the third subordinate space C, the fourth subordinate space D, and the fifth subordinate space E.

Figure 10:
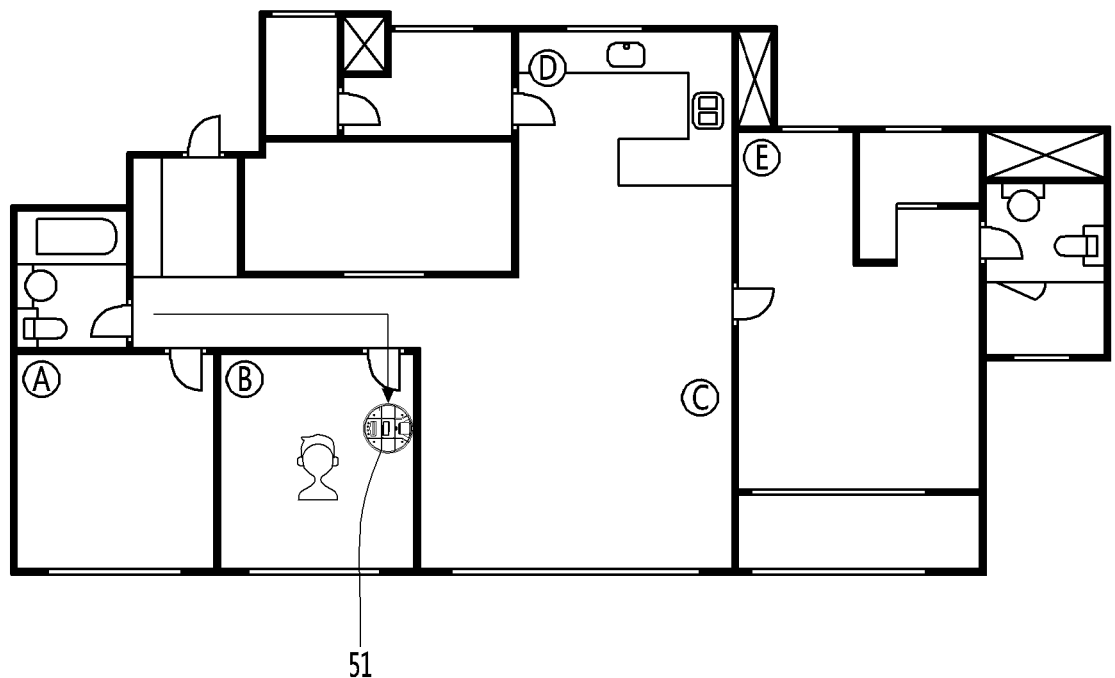
FIG. 10 is a view for explaining an operation of the robot cleaner when the robot cleaner enters the subordinate space according to the changed priority, but a member exists in the subordinate space according to an embodiment.

FIG. 10 is a view for explaining a method for determining the priority according to the return time according to an embodiment.

The processor may determine the cleaning priority of the plurality of subordinate spaces based on the return times of some or all of the plurality of members.

In this case, the processor may change the preset cleaning priority to another cleaning priority based on the return time of some or all of the plurality of members.

Particularly, if it is predicted that the second member 712 returns to the home before the first member 711, the processor may clean the second subordinate space B of the second member 712 first and then clean the first subordinate space A of the first member 711 after cleaning the second subordinate space B.

For example, according to the cleaning priority set in advance, the first subordinate space A of the first member 711 has to be cleaned, and then, the second subordinate space B of the second member 712 has to be cleaned. However, if it is determined that the second member 712 returns to the home first when compared to the first member 711, the processor may clean the second subordinate space B of the second member 712 first and then clean the first subordinate space A of the first member 711 after cleaning the second subordinate space B.

According to an embodiment, when the members are in their subordinate spaces, there is an advantage that the interference with the cleaning operation of the robot cleaner is minimized.

When it is predicted that the second member 712 returns to the home before the first member 711, and it is predicted that it is difficult to clean the second subordinate space B before the second member 712 returns to the home when the cleaning is performed according to the preset cleaning priority, the second subordinate space B of the second member 712 may be cleaned first, and then, the first subordinate space A of the first member 711 may be cleaned after cleaning the second subordinate space B.

Particularly, the processor may store a time required for cleaning each of the plurality of subordinate spaces in the memory.

Also, when it is predicted that the second member 712 returns to the home before the first member 711, and the cleaning is performed according to the preset cleaning priority, it may be determined whether or to clean the second subordinate space B before the second member 712 returns to the home.

For example, when a time required to clean the first subordinate space A is about 30 minutes, a time required to clean the second subordinate space B is about 20 minutes, and the second member 712 is expected to return to the home after about 40 minutes, the processor may determine that it is difficult to clean the second subordinate space B before the second member 712 returns to the home.

Also, if it is predicted that the cleaning is performed according to the priority, when it is predicted that it is difficult to clean the second subordinate space before the second member returns to the home, the processor may clean the second subordinate space of the second member first and then clean the first subordinate space for the first member after cleaning the second subordinate space.

If the second member returns to the home before the first member, but the second subordinate space is capable of being cleaned before the second member returns to the home even if the cleaning is performed according to the preset cleaning priority, the processor may perform the cleaning according to the preset priority. That is, the processor may control the robot cleaner to clean the first subordinate space first and then the second subordinate space after the first subordinate space.

According to an embodiment, when it is difficult to clean the second subordinate space before the second member returns to the home, the second subordinate space may be cleaned first to prevent the second member from being disturbed by the cleaning operation of the robot cleaner. Also, when it is possible to clean the second subordinate space before the second member returns to the home, the cleaning is performed according to the preset priority to maximally reduce the moving path of the robot cleaner.

A case in which there is two or more subordinate spaces corresponding to one member are provided will be described.

The subordinate space of the second member 712 may be the second subordinate space B, the third subordinate space C, and the fifth subordinate space E.

Also, when it is predicted that the second member returns to the home before the first member, the processor may control the robot cleaner to clean the second subordinate space B of the second member first and then clean the third subordinate space C of the second member after cleaning the second subordinate space B and clean the first subordinate space A of the first member after cleaning the third subordinate space C.

According to an embodiment, when there are multiple subordinate spaces of the second member returning to the home first, all of the subordinate spaces of the second member may be cleaned, and then, the subordinate space of the first member may be cleaned to minimize the disturbance of the second member by the robot cleaner.

Here, the second subordinate space B may be a subordinate space of the second member occupied by the second member alone. Here, the fact that the second member occupies the second subordinate space B alone may mean that the second subordinate space B is determined to correspond to the second member uniquely.

Also, the third subordinate space C may be a subordinate space of the second member, in which the second member occupies together with other members. Here, that the second member occupies the third subordinate space C alone may mean that the third subordinate space C has been determined to correspond to the second member and the other member. For example, the subordinate space corresponding to the second user 712 may be the third subordinate space C, and the subordinate space corresponding to the third user 713 may also be the third subordinate space C.

Also, when there are a plurality of subordinate spaces B, C, and E corresponding to the second member, the processor may control the robot cleaner to clean the second subordinate space B solely occupied first by the second member of the plurality of subordinate spaces. Also, the processor may control the robot cleaner to clean the subordinate space (the second subordinate space B or the fifth subordinate space E) occupied by the second member together with the other members of the plurality of subordinate spaces.

According to an embodiment, when there are several subordinate spaces of the second member returning to the home first, the subordinate space used exclusively by the second member may be cleaned first to clean the most personal space of the second member first.

When there are a plurality of subordinate spaces C and E occupied together with other members among the plurality of subordinate spaces B, C, and E corresponding to the second member, the processor may control the robot cleaner to clean a subordinate space that is close to the second subordinate space B. That is, the processor may control the robot cleaner to clean the second subordinate space B and clean the third subordinate space C, and then clean the fifth subordinate space E and clean the first the subordinate space A of the first member.

According to an embodiment, when there are a plurality of subordinate spaces occupied together with other members, the first cleaner may clean the subordinate space that is close to the second subordinate space B, thereby reducing the moving path of the robot cleaner.

When it is predicted that the plurality of members do not return to the home before completing the cleaning of the indoor space, the processor may control the robot cleaner to perform the cleaning according to the predetermined cleaning priority.

Particularly, the processor may store the time required for cleaning the indoor space in the memory.

Also, when it is predicted that all of the plurality of members do not return to the home before completing the cleaning of the indoor space, the processor may control the robot cleaner to perform the cleaning according to the preset cleaning priority.

Particularly, the processor may compare the time taken to clean the indoor space with the return time of all the plurality of members to determine whether the plurality of members return to the home before completing the cleaning of the indoor space. Also, when it is predicted that all of the plurality of members do not return to the home before completing the cleaning of the indoor space, the processor may control the robot cleaner to perform the cleaning according to the preset cleaning priority.

The predetermined cleaning priority has been described above as a priority for minimizing a length of the moving path of the robot cleaner. That is, according to an embodiment, when it is predicted that all of the plurality of members do not return to the home before the cleaning of the indoor space is completed, the cleaning may be performed according to the predetermined cleaning priority, thereby reducing the moving path of the robot cleaner as much as possible.

The time required for cleaning each of the plurality of subordinate spaces may be stored in the memory.

Also, when it is predicted that the second member 712 returns to the home before the first member 711, and the cleaning is performed according to the preset cleaning priority, it may be determined whether or to clean the second subordinate space B before the second member 712 returns to the home.

For example, when a time required to clean the first subordinate space A is about 30 minutes, a time required to clean the second subordinate space B is about 20 minutes, and the second member 712 is expected to return to the home after about 40 minutes, the processor may determine that it is difficult to clean the second subordinate space B before the second member 712 returns to the home.

Also, if it is predicted that the cleaning is performed according to the priority, when it is predicted that it is difficult to clean the second subordinate space before the second member returns to the home, the processor may clean the second subordinate space of the second member first and then clean the first subordinate space for the first member after cleaning the second subordinate space.

If the second member returns to the home before the first member, but the second subordinate space is capable of being cleaned before the second member returns to the home even if the cleaning is performed according to the preset cleaning priority, the processor may perform the cleaning according to the preset priority. That is, the processor may control the robot cleaner to clean the first subordinate space first and then the second subordinate space after the first subordinate space.

According to an embodiment, when it is difficult to clean the second subordinate space before the second member returns to the home, the second subordinate space may be cleaned first to prevent the second member from being disturbed by the cleaning operation of the robot cleaner. Also, when it is possible to clean the second subordinate space before the second member returns to the home, the cleaning is performed according to the preset priority to maximally reduce the moving path of the robot cleaner.

A case in which there is two or more subordinate spaces corresponding to one member are provided will be described.

The subordinate space of the second member 712 may be the second subordinate space B, the third subordinate space C, and the fifth subordinate space E.

Also, when it is predicted that the second member returns to the home before the first member, the processor may control the robot cleaner to clean the second subordinate space B of the second member first and then clean the third subordinate space C of the second member after cleaning the second subordinate space B and clean the first subordinate space A of the first member after cleaning the third subordinate space C.

Here, the second subordinate space B may be a subordinate space of the second member occupied by the second member alone. Here, the fact that the second member occupies the second subordinate space B alone may mean that the second subordinate space B is determined to correspond to the second member uniquely.

Also, the third subordinate space C may be a subordinate space of the second member, in which the second member occupies together with other members. Here, that the second member occupies the third subordinate space C alone may mean that the third subordinate space C has been determined to correspond to the second member and the other member. For example, the subordinate space corresponding to the second user 712 may be the third subordinate space C, and the subordinate space corresponding to the third user 713 may also be the third subordinate space C.

Also, when there are a plurality of subordinate spaces B, C, and E corresponding to the second member, the processor may control the robot cleaner to clean the second subordinate space B solely occupied first by the second member of the plurality of subordinate spaces. Also, the processor may control the robot cleaner to clean the subordinate space (the second subordinate space B or the fifth subordinate space E) occupied by the second member together with the other members of the plurality of subordinate spaces.

When there are a plurality of subordinate spaces C and E occupied together with other members among the plurality of subordinate spaces B, C, and E corresponding to the second member, the processor may control the robot cleaner to clean a subordinate space that is close to the second subordinate space B. That is, the processor may control the robot cleaner to clean the second subordinate space B and clean the third subordinate space C, and then clean the fifth subordinate space E and clean the first the subordinate space A of the first member.

FIG. 10 is a view for explaining an operation of the robot cleaner when the robot cleaner enters the subordinate space according to the changed priority, but a member exists in the subordinate space according to an embodiment.

When it is predicted that the second member returns to the home before the first member, the processor may enter the second subordinate space B of the second member earlier than the first subordinate space A of the first member.

Also, when there is no second member in the second subordinate space B, the processor may control the robot cleaner to clean the second subordinate space B first.

On the other hand, when the second subordinate space B of the second member enters the second subordinate space B before the first subordinate space A of the first member, but the second member exists in the second subordinate space B, the processor may control the robot clean to clean a subordinate space different from the second subordinate space first. Also, the processor may update the return pattern of the second member by using the information in which the second member exists at the current time.

That is, according to an embodiment, when the robot cleaner's return time prediction is missed, and thus, the member exists in the subordinate space, there is an advantage of preventing the member from being disturbed because the subordinate space is not cleaned.

When it is predicted that the second member returns to the home before the first member, the processor may enter the second subordinate space B of the second member earlier than the first subordinate space A of the first member. When there is a member different from the second member in the second subordinate space B, the processor may control the robot cleaner to clean the second subordinate space B first.

For example, the study may be the father's subordinate space, and the mother may have visited the study for a while. Also, in this case, even if the robot cleaner cleans the library, it does not disturb the father. Thus, when there is a member different from the second member in the second subordinate space B, the processor may control the robot cleaner to clean the second subordinate space B.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence robot cleaner comprising:
   at least one driving motor configured to move the artificial intelligence robot cleaner in an indoor space of a home;
   cleaning unit configured to remove dust or foreign substances for performing cleaning;
   a sensor configured to acquire data used to identify a plurality of individuals; and
   a processor configured to:
   determine one or more subordinate spaces corresponding to each of the plurality of individuals among a plurality of subordinate spaces by using the acquired data and a map of the indoor space,
   determine a return time of at least one of the plurality of individuals,
   determine a cleaning priority of the plurality of subordinate spaces based on the determined return time, wherein the cleaning priority of the plurality of subordinate spaces is determined by prioritizing a subordinate space associated with a single individual before a subordinate space associated with multiple individuals when the single individual is associated with multiple subordinate spaces, and
   perform cleaning according to the determined cleaning priority,
   wherein the processor is further configured to:
   skip the cleaning of a specific subordinate space when an individual associated with the specific subordinate space among the one or more subordinate spaces has entered the specific subordinate space, and
   continue performing the cleaning of the specific subordinate space even when an individual not associated with the specific subordinate space has entered the subordinate space.

2. The artificial intelligence robot cleaner according to claim 1, wherein the processor is further configured to: control the robot cleaner to clean a first subordinate space of a first individual according to a preset cleaning priority and clean a second subordinate space of a second individual after cleaning the first subordinate space.

3. The artificial intelligence robot cleaner according to claim 2, wherein, based on a prediction that the second individual returns to the home before the first individual, the processor is further configured to: control the robot cleaner to clean the second subordinate space of the second individual and to clean the first subordinate space of the first individual after cleaning the second subordinate space.

4. The artificial intelligence robot cleaner according to claim 3, wherein, based on the prediction that the second individual returns to the home before the first individual, and based on the cleaning being performed according to the preset cleaning priority, based on a prediction that cleaning of the second subordinate space cannot be completed before the second individual returns to the home, the processor is further configured to: control the robot cleaner to clean the second subordinate space of the second individual first and clean the first subordinate space of the first individual after cleaning the second subordinate space.

5. The artificial intelligence robot cleaner according to claim 3, wherein, based on the prediction that the second individual returns to the home before the first individual, the processor is further configured to: control the robot cleaner to clean a third subordinate space of the second individual after cleaning the second subordinate space and clean the first subordinate space of the first individual after cleaning the third subordinate space.

6. The artificial intelligence robot cleaner according to claim 5, wherein the second subordinate space comprises a subordinate space of the second individual occupied solely by the second individual, and
   the third subordinate space comprises a subordinate space of the second individual occupied together with other individuals.

7. The artificial intelligence robot cleaner according to claim 2, wherein, based on a prediction that the plurality of individuals do not return to the home before cleaning of the indoor space is completed, the processor is further configured to: control the robot cleaner to perform the cleaning according to the preset cleaning priority.

8. The artificial intelligence robot cleaner according to claim 1, wherein the processor is further configured to: determine the return time based on at least one of schedule information of the plurality of individuals, a return pattern of the plurality of individuals, or a conversation of the plurality of individuals.

9. The artificial intelligence robot cleaner according to claim 8, further comprising a communicator configured to communicate with terminals of the plurality of individuals,
   wherein the processor is further configured to: receive the schedule information of the plurality of individuals and determine the return time by using the schedule information of the plurality of individuals.

10. The artificial intelligence robot cleaner according to claim 8, wherein the processor is further configured to: acquire the return pattern of the plurality of individuals by using the acquired data to identify the plurality of individuals and determine the return time based on the return pattern.

11. The artificial intelligence robot cleaner according to claim 8, further comprising:
    a microphone configured to receive the conversation of the plurality of individuals; and
    a communicator is further configured to: communicate with the plurality of individuals,
    wherein the processor is further configured to determine the return time based on at least one of a voice conversation received through the microphone, a voice conversation during a call received through the communicator, or a text conversation received through the communicator.

12. The artificial intelligence robot cleaner according to claim 3, wherein, based on the prediction that the second individual returns to the home before the first individual, the processor is further configured to: control the robot cleaner to enter the second subordinate space of the second individual, and when the second individual is not present in the second subordinate space, the processor is further configured to: control the robot cleaner to clean the second subordinate space first.

13. The artificial intelligence robot cleaner according to claim 3, wherein, based on the prediction that the second individual returns to the home before the first individual, the processor is further configured to: control the robot cleaner to enter the second subordinate space of the second individual first, and when an individual different from the second individual exists in the second subordinate space, the second subordinate space is cleaned first.

14. The artificial intelligence robot cleaner according to claim 3, wherein, based on the prediction that the second individual returns to the home before the first individual, the processor is further configured to: control the robot cleaner to enter the second subordinate space of the second individual first, and when the second individual is not present in the second subordinate space, a subordinate space different from the second subordinate space is cleaned first.

* * * * *